United States Patent [19]

Berry

[11] 4,109,097

[45] Aug. 22, 1978

[54] EXPANSION-DEFLECTION COUPLING

[75] Inventor: Richard C. Berry, Camillus, N.Y.

[73] Assignee: Crouse-Hinds Company, Syracuse, N.Y.

[21] Appl. No.: 773,369

[22] Filed: Mar. 1, 1977

[51] Int. Cl.² ............................................. H02G 15/08
[52] U.S. Cl. ........................................ 174/86; 174/78; 285/235
[58] Field of Search ............... 285/236, 235, 233, 234, 285/149; 174/78, 84 S, 86, 21 CA; 403/223, 300

[56] References Cited

U.S. PATENT DOCUMENTS

| 1,044,962 | 11/1912 | Witzenmann | 285/235 |
| 1,242,874 | 10/1917 | Sheafe et al. | 285/235 |
| 2,885,461 | 5/1959 | Cafiero | 174/84 S |

FOREIGN PATENT DOCUMENTS

| 383,257 | 12/1907 | France | 285/235 |
| 451,071 | 2/1913 | France | 285/236 |
| 1,218,820 | 6/1966 | Fed. Rep. of Germany | 285/235 |

Primary Examiner—George H. Krizmanich
Attorney, Agent, or Firm—Sughrue, Rothwell, Mion, Zinn and Macpeak

[57] ABSTRACT

A coupling which allows for linear or angular displacement as well as for expansion or contraction is comprised of two independent hubs adapted to be threaded on the ends of opposed spaced apart conduits, a flexible grounding strap connected between said hubs, a flexible watertight jacket substantially surrounding and clamped to said hubs at each end and a tubular raceway having flared ends moveably retained within each of said hubs to protect wires running through the coupling.

6 Claims, 2 Drawing Figures

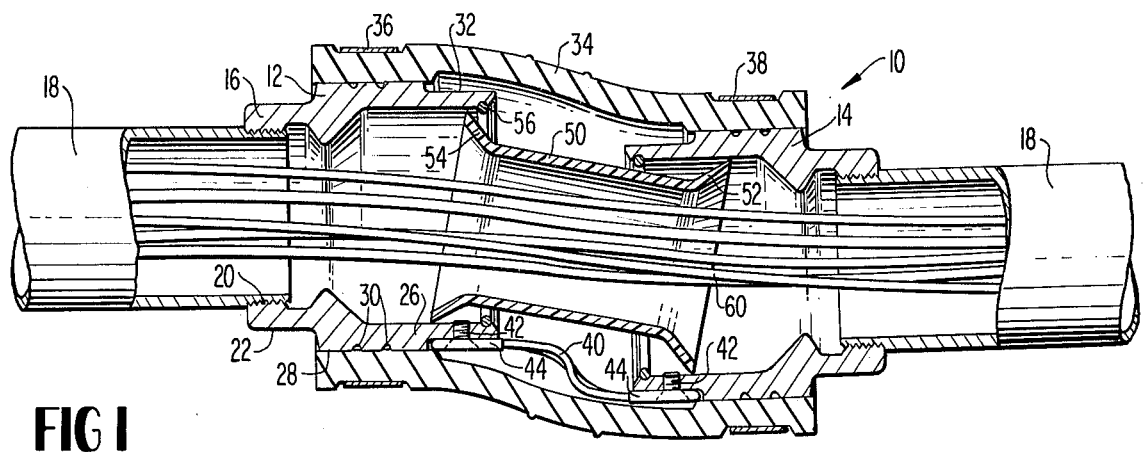
FIG 1
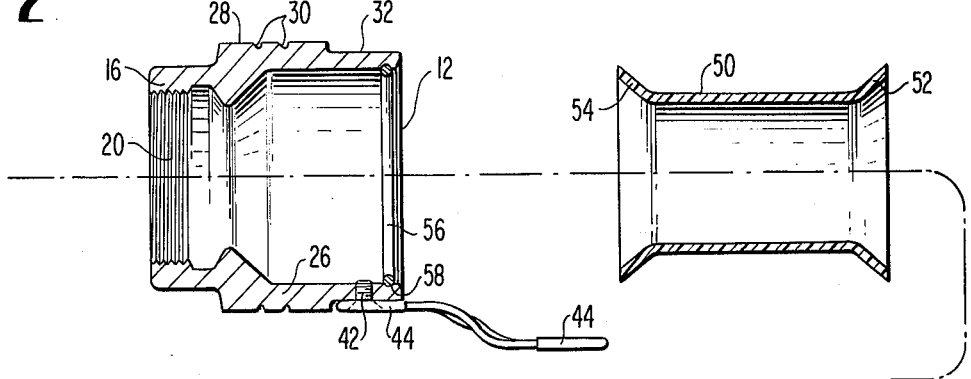
FIG 2
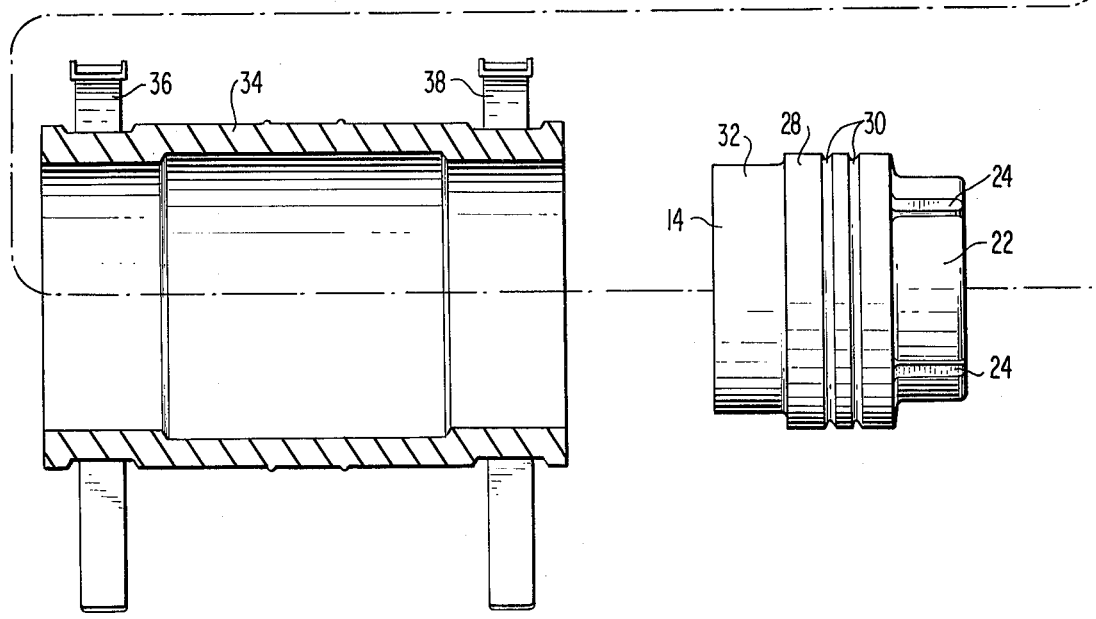

EXPANSION-DEFLECTION COUPLING

BACKGROUND OF THE INVENTION

1. Field of the Invention

The present invention is directed to expansion-deflection couplings and more particularly to couplings for sealingly connecting the opposed spaced apart ends of two conduits which might be subject to linear or angular misalignment or which might be susceptible of expansion or contraction.

2. Prior Art

In numerous construction projects it is often necessary for conduits to be embedded in large concrete pours or blocks which may be subject to movement relative to each other. Such relative movement necessitates the use of expansion-deflection type couplings in conduits running between adjacent concrete pours to prevent damage to the conduit or the cables inside. Expansion-deflection type couplings are also necessary to span expansion joints in bridges wherein the structural movement would be caused by thermal expansion-contraction or by heavy vehicular traffic. Long underground conduit runs are commonly used to interconnect widely spread facilities and the use of expansion-deflection couplings will accommodate conduit movement in such long runs caused by ground settling or seismic forces. Likewise such couplings are necessary to provide the necessary flexibility at the service entrance to a building to accommodate movement caused by high winds or earthquakes or to provide the necessary flexibility to compensate for structural movement caused by settling.

Expansion-deflection type couplings can be installed indoors, outdoors, buried underground or embedded in concrete in non-hazardous areas. They can be used with standard rigid conduit and PVC rigid conduit. Use with PVC requires rigid metal conduit to PVC conduit adapters. Expansion-deflection couplings provide a flexible and watertight connection between sections of conduit which are vulnerable to stresses and displacement as a result of the above mentioned causes.

Prior art type expansion-deflection couplings utilize only a neoprene sleeve which is clamped to the external surface of hub end fittings which are adapted to be threaded on the ends of opposing conduits. In such prior art constructions the sleeve does not completely enclose the grounding strap or cover the strap to hub attachment points. Furthermore, such prior art couplings do not provide an internal sleeve which will span the gap between the hubs to separate the grounding strap from the wiring or maintain a uniform internal diameter for the passage of wires regardless of the expansion or deflection of the flexible sleeve. Finally, the prior art devices secure the grounding straps to the hubs in the vicinity of the wrenching surface of the hubs thereby exposing said connections to possible damage during wrenching with attendant interruption of the ground connection.

SUMMARY OF THE INVENTION

The present invention provides an expansion-deflection coupling which completely solves the problem of movement between two sections of rigid conduit runs without damage to conduit, cable or wires. By using the coupling according to the present invention conduit sections can be reliably connected where ever expansion, deflection or contraction is likely to occur, especially in construction projects where conduit runs are embedded in concrete, buried underground or subjected to structural movement.

The expansion-deflection coupling according to the present invention provides an improved watertight connection between the outer flexible sleeve and the hubs which are adapted to be connected to the opposed ends of rigid conduits and it provides an improved grounding strap connection between the two hubs which is completely enclosed by the flexible outer sleeve independent and separate from the wrenching surface of each hub and a surface of each hub upon which said sleeve is clamped.

The expansion-deflection coupling according to the present invention maintains a uniform internal diameter through the coupling independent of the expansion, deflection or contraction by the provision of a tubular raceway which spans the gap between the two hubs of the coupling.

The expansion-deflection coupling according to the present invention is comprised of a pair of hub fittings having a first annular portion of a predetermined internal diameter adapted to be secured to a conduit and a second annular portion having a larger internal diameter, a rigid tubular raceway having an internal diameter substantially equal to the internal diameter of the first annular portion of each hub and having outwardly flared end portions disposed within the second annular portion of each hub, means adjacent the end of said second portion of each hub for preventing removal of the flared ends of said raceway, grounding strap means secured to the outer ends of said second portion of each hub and flexible, resilient sleeve means secured in a watertight manner to the outer surface of each hub intermediate the first annular portion and the grounding strap connection of each hub.

The foregoing and other objects, features and advantages of the invention will be apparent from the following more particular description of a preferred embodiment of the invention as illustrated in the accompanying drawings.

BRIEF DESCRIPTION OF THE DRAWINGS

FIG. 1 is a longitudinal sectional view of the coupling according to the present invention as assembled and connected to a pair of conduit ends which are axially misaligned with respect to each other.

FIG. 2 is an exploded view of the individual parts which constitute the coupling, some of said parts being illustrated in longitudinal section and others is side elevation.

DETAILED DESCRIPTION OF THE INVENTION

The expansion-deflection coupling according to the present invention is suitable for use in a number of environments and can be manufactured in a variety of sizes adapted to be compatable with standard conduits of differing diameters. The couplings can be used with standard rigid conduit as well as PVC rigid conduit. The use of the coupling with PVC requires a rigid metal conduit to PVC conduit adapter which is conventional and is therefore not illustrated in the present application. The coupling 10 is comprised of a pair of hubs 12 and 14 which are identical to each other. The hub 12 is provided with a first annular portion 16 having an internal diameter compatable with the external diameter of the conduit 18 to which it is to be secured. The internal surface of the first annular portion 16 may be provided with threads 20 for securement to the conduit 18. The outer annular surface 22 acts as a wrenching surface and is provided with a plurality of spaced apart projections 24 to facilitate gripping of the hub by means of a wrench. The hub 12 is also provided with a second annular portion 26 having an internal diameter substantially larger than the internal diameter of the first annular portion 16. The outer surface 28 of the second portion 26 is provided with a plurality of annular grooves 30 substantially midway between the ends of the hub to facilitate the connection of a flexible sleeve thereto as described hereinafter. The outer end of the surface 28 is reduced at 32 to provide an annular recess to facilitate the connection of the grounding strap in a manner which will not interfer with the connection of the flexible sleeve to the surface 28. Since the other hub 14 is identical in construction a detailed description thereof is not deemed necessary.

A flexible resilient sleeve 34 of neoprene or any other suitable material is clamped at each end to the surface 28 of each hub 12 and 14 by means of conventional clamping straps 36 and 38. The compressive force exerted by the clamping straps 36 and 38 will force the material of the sleeve into the grooves 30 to provide a firm waterproof connection between the sleeve 34 and the hubs 12 and 14. The clamping straps 36 and 38 are preferably of stainless steel material and the hubs 12 and 14 may be zinc plated to resist corrosion.

A tined braided-copper grounding strap 40 is secured by screws 42 to the reduced diameter annular surface 32 of each hub 12 and 14. The thickness of the end fittings 44 of the grounding strap 40 as well as the heads of the screws 42 are such that neither will protrude beyond the clamping surfaces 28 of each hub to prevent interference. By locating the strap and screws completely within the sleeve between the clamped end portions of the sleeve the grounding strap and screws will be completely protected from any damage which might occur from wrenching, corrosion or any other source.

A rigid tubular raceway 50 of plastic material may be disposed in a "floating" manner within each hub while extending therebetween. The internal diameter of the raceway 50 is substantially equal to the internal diameter of the first annular portion 16 of each hub so as to assure a minimum internal diameter through the coupling commensurate with the internal diameter of the conduit sections 18 to which the coupling is secured regardless of expansion, compression, deflection or angular displacement. The opposite ends of the raceway are outwardly flared at 52 and 54 with the maximum outer diameter of the flared end portions being substantially equal to but slightly less than the internal diameter of the second annular portion 26 of each hub. Thus the ends of the raceway 50 may slide telescopically with respect to each hub 12 and 14 any may be angularly disposed relative to the longitudinal axis of the hubs 12 and 14 when misaligned as shown in FIG. 1 or deflected at an angle to each other (not shown). A snap ring 56 is secured in an internal groove 58 adjacent the free end of the second annular portion 26 of each hub. The internal diameter of each snap ring 56 when assembled to the hub is sufficiently greater than the external diameter of the flared ends of the raceway 50 to prevent removal of the flared ends from the hubs.

The expansion-deflection coupling allows for linear misalignment of the hubs of the type illustrated in FIG. 1 up to ⅜ of an inch. The coupling also allows for angular displacement of the hubs relative to each other up to 30° and allows for expansion or contraction of the coupling up to ⅜ of an inch. By expansion or contraction is meant the movement of the hubs away from or toward each other. The provision of the raceway will completely protect the wires 60 passing through the coupling from contact with or abrasion by the grounding strap 40 and will maintain a uniform diameter through the coupling by preventing the inward collapse of the flexible sleeve during misalignment. The provision of a constant internal diameter through the coupling provides greater wire protection and easier wire pulling.

While the invention has been particularly shown and described with reference to a preferred embodiment it will be understood by those in the art that various changes in form and details may be made therein without departing from the spirit and scope of the invention.

What is claimed is:

1. An expansion-deflection coupling comprising a pair of identical hub fittings each having a first annular portion of a predetermined internal diameter adapted to be secured to a conduit and a second annular portion having a larger internal diameter, a rigid tubular raceway having each end thereof moveably disposed within the second annular portion of a respective hub fitting, resilient flexible sleeve means secured to the outer surface of said second annular portion of each hub and extending between said hubs and grounding strap means secured to the end of said second annular portion of each hub and extending between said hubs.

2. An expansion-deflection coupling as set forth in claim 1 wherein said raceway is provided with an internal diameter substantially equal to the internal diameter of said first annular portion of each hub and having outwardly flared end portions the outer diameter of which is substantially equal to but less than the internal diameter of said second annular portion of each hub.

3. An expansion-deflection coupling as set forth in claim 2 further comprising means secured to the inner surface of said second annular portion of each hub for retaining the flared ends of said raceway within each hub.

4. An expansion-deflection coupling as set forth in claim 1 wherein the outer surface of said second annular portion of each hub is recessed adjacent the free end thereof and means for securing said strap means to each hub in said recessed surface.

5. An expansion-deflection coupling as set forth in claim 1 further comprising projections on the outer surface of said first annular portion of each hub to provide gripping surfaces for a wrench.

6. An expansion-deflection coupling as set forth in claim 1 further comprising compressive band means surrounding the opposite ends of said sleeve means for clamping said sleeve means to the outer surface of said second annular portion of each hub in a watertight manner.

* * * * *